United States Patent
Rao

(10) Patent No.: US 7,382,741 B2
(45) Date of Patent: Jun. 3, 2008

(54) CONFIGURATION OF WIRELESS NETWORK CLIENT

(75) Inventor: Abhijit B. Rao, Irvine, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 940 days.

(21) Appl. No.: 10/606,851

(22) Filed: Jun. 25, 2003

(65) Prior Publication Data

US 2004/0264395 A1 Dec. 30, 2004

(51) Int. Cl.
*H04L 12/28* (2006.01)

(52) U.S. Cl. .............. 370/255; 370/312; 709/221; 709/222; 709/224; 709/229

(58) Field of Classification Search ........... 370/254, 370/255, 312, 338; 709/220, 221, 222, 224, 709/229

See application file for complete search history.

(56) References Cited

U.S. PATENT DOCUMENTS

| | | | |
|---|---|---|---|
| 6,301,618 B1 | 10/2001 | Sitaraman et al. | 709/227 |
| 6,463,473 B1 | 10/2002 | Gubbi | 709/225 |
| 6,484,029 B2 * | 11/2002 | Hughes et al. | 455/434 |
| 6,532,217 B1 * | 3/2003 | Wootton et al. | 370/252 |
| 6,667,690 B2 * | 12/2003 | Durej et al. | 340/572.1 |
| 6,697,360 B1 * | 2/2004 | Gai et al. | 370/389 |
| 6,754,488 B1 * | 6/2004 | Won et al. | 455/424 |
| 6,862,285 B1 * | 3/2005 | Jeffrey et al. | 370/395.3 |
| 7,016,948 B1 * | 3/2006 | Yildiz | 709/221 |
| 7,042,852 B2 * | 5/2006 | Hrastar | 370/310 |
| 7,043,540 B2 * | 5/2006 | Moore et al. | 709/220 |
| 7,051,087 B1 * | 5/2006 | Bahl et al. | 709/220 |
| 7,088,687 B2 * | 8/2006 | Ayyagari et al. | 370/278 |
| 7,103,661 B2 * | 9/2006 | Klein | 709/225 |
| 7,120,129 B2 * | 10/2006 | Ayyagari et al. | 370/255 |
| 7,146,130 B2 * | 12/2006 | Hsu et al. | 455/3.04 |
| 7,152,099 B1 * | 12/2006 | Arens | 709/220 |
| 7,187,925 B2 * | 3/2007 | Abhishek et al. | 455/426.1 |
| 7,269,388 B2 * | 9/2007 | Poursabahian et al. | 455/41.2 |
| 7,283,505 B1 * | 10/2007 | Meenan et al. | 370/338 |

(Continued)

FOREIGN PATENT DOCUMENTS

JP 2001-54165 2/2001

(Continued)

OTHER PUBLICATIONS

IEEE Standards Boards, "Wireless LAN Medium Access Control (MAC) and Physical Layer (PHY) specifications", 1997, IEEE, New York, NY, selected pages.*

*Primary Examiner*—Hassan Kizou
*Assistant Examiner*—Brian T O'Connor
(74) *Attorney, Agent, or Firm*—Fitzpatrick, Cella, Harper & Scinto

(57) ABSTRACT

Configuration of a wireless network client to access an appropriate wireless access point in a network environment wherein the configuration includes discovering a wireless local network identity of each wireless access point in the network environment, monitoring each identified wireless local network for detection of a predetermined broadcast message, and configuring, in the case that the predetermined broadcast message is detected in the monitoring step, the wireless network client configures itself to access the wireless access point corresponding to the wireless local network on which the predetermined broadcast message was detected, and sending a configuration announcement message from the wireless network client on the wireless local network.

36 Claims, 8 Drawing Sheets

U.S. PATENT DOCUMENTS

| | | |
|---|---|---|
| 7,333,464 B2* | 2/2008 | Yang et al. .................. 370/338 |
| 2002/0118664 A1 | 8/2002 | Ishibashi et al. ............ 370/338 |
| 2002/0136226 A1* | 9/2002 | Christoffel et al. ......... 370/401 |
| 2004/0003060 A1 | 1/2004 | Asoh et al. .................. 709/220 |
| 2004/0082356 A1* | 4/2004 | Walton et al. .............. 455/522 |
| 2004/0105414 A1* | 6/2004 | Narayanan et al. ......... 370/338 |
| 2004/0151193 A1* | 8/2004 | Rune et al. .................. 370/401 |

FOREIGN PATENT DOCUMENTS

| | | |
|---|---|---|
| JP | 2002-252620 | 9/2002 |
| JP | 2003-91467 | 3/2003 |

* cited by examiner

CONFIGURATION OF WIRELESS NETWORK CLIENT

BACKGROUND OF THE INVENTION

1. Field of the Invention

The present invention relates to the automatic configuration of a wireless network client in a network environment having a wireless access point, without the need for user intervention. In particular, the invention relates to the use of an installation program in a computer which is already configured to access a particular local network, wherein the installation program repeatedly broadcasts a predetermined message. The wireless network client identifies and then monitors all wireless local networks for the predetermined message. Upon detection of the predetermined message by the wireless network client, the wireless network client configures itself to access the wireless access point on the particular wireless local network.

2. Description of the Related Art

The use of wireless local area networks (WLANs) is very popular in both business and home computing environments for supporting communication between computing devices, peripherals and servers via a wireless access point. In general, a WLAN is a wireless local area network that used high-frequency radio waves to communicate between network devices, instead of using wires to support the connection. A WLAN is supported by a wireless access point which acts as a wireless communication hub for network devices to communicate with each other, or with a wired LAN to which the wireless access point is connected. Each network device in the WLAN, other than the wireless access point, communicates as a WLAN client through a wireless interface card or device.

When each new WLAN client device is introduced into the WLAN, either by a system administrator in a business setting or by a home user, the WLAN client device must be configured to properly communicate with the wireless access point. This configuration process is often performed via a user interface on a computer that is directly wired to the WLAN client for configuration purposes. In order for a WLAN client to be configured to communicate with the wireless access point, it must be given the value of a network identifier which is used by all devices in that particular WLAN, and, if security encryption, such as wired equivalent protection (WEP), is used in the WLAN, the WEP-related information must also be given to the WLAN client.

Unfortunately, the configuration of a WLAN client is often confusing, tedious and cumbersome for the user because the user must obtain the network identifier and the WEP-related information from the existing WLAN, and then must navigate through whatever user-interface is provided with the WLAN client to properly configure the WLAN client using the obtained network identifier and the WEP-related information. This process is further complicated when many WLAN clients are added to the WLAN at the same time.

The foregoing configuration scheme has the disadvantages that the user must be technically sophisticated in the subject of WLANs, and must be able to readily access the network identifier and navigate a confusing configuration user interface every time the user wishes to add or reconfigure a WLAN client in the WLAN.

SUMMARY OF THE INVENTION

The present invention addresses the foregoing disadvantages by providing for the automatic configuration of a wireless network client in a network environment without the need for user intervention. In particular, the invention uses an installation program in a computer which is already configured to access a particular local network. The installation program repeatedly broadcasts a predetermined message, and the wireless network client identifies and then monitors all wireless local networks for the predetermined message. Upon detection of the predetermined message by the wireless network client, the wireless network client configures itself to access the wireless access point on the particular wireless local network in which the predetermined message was detected.

In one aspect, the invention is directed to a method for use in a wireless network client to configure the wireless network client to access an appropriate wireless access point in a network environment, the method including the steps of discovering a wireless local network identity of each wireless access point in the network environment, monitoring each identified wireless local network for detection of a predetermined broadcast message, and configuring, in the case that the predetermined broadcast message is detected in the monitoring step, the wireless network client to access the wireless access point corresponding to the wireless local network on which the predetermined broadcast message was detected, and sending a configuration announcement message from the wireless network client on the wireless local network.

Preferably, each predetermined wireless channel is monitored for each identified wireless local network for a predetermined period of time in order to detect the predetermined broadcast message. Also, the predetermined broadcast message preferably includes a predetermined character string and the IP address of the sending device, which is preferably an already configured computer in the WLAN which runs installation software. Also, the wireless network client maintains a monitor table which contains entries for each discovered wireless local network identifier, such as a service set identifier (SSID) in an 802.11 environment, the MAC address and the signal-to-noise ratio of the wireless access point corresponding to each network identifier, and an indication of whether or not the predetermined broadcast message has been detected on the wireless local network corresponding to each network identifier.

In this manner, the present invention provides for automatic configuration of a wireless network client without user intervention. In particular, the user can avoid having to obtain the network identifier, and can avoid having to navigate confusing configuration set-up interfaces for each wireless network client being configured. Accordingly, increased reliability and reduction in installation time is achieved for configuration of each new wireless network client by a user.

In another aspect, the invention is directed to a method for use in a computing device which is configured to access a network environment having a particular wireless access point, the method for configuring a wireless network client to access the particular wireless access point. The method includes the steps of initiating broadcasts from the computing device of a predetermined broadcast message on a wireless local network which corresponds to the particular wireless access point, monitoring the wireless local network which corresponds to the particular wireless access point for detection of a configuration announcement message from the wireless network client, and terminating, in the case that the configuration announcement message is detected in the monitoring step or in the case that a timeout period has elapsed, the broadcasts from the computing device of the predetermined broadcast message.

Preferably, the predetermined broadcast message is broadcast periodically at a predetermined time interval. In addition, the broadcasts of the predetermined broadcast message are preferably terminated in the case that the configuration announcement message is detected and a state variable in the configuration announcement message indicates that the wireless network client is a new device on the wireless local network. Preferably, an error message is generated in the case that the timeout period has elapsed and there has been no detection of a configuration announcement message from a new wireless network client. The error message preferably initiates a user-interface message on the computer display or on a network peripheral, and the user-interface message indicates that manual identification of a wireless local network identity is required to configure the wireless network client. The error message may include a list of detected wireless local network identities in the wireless network environment. Upon a user selection of one of the displayed wireless local network identities, a configuration message is sent, via a connection path such as a USB or other connection, from the computing device to the wireless network client which contains the user selected wireless local network identity for configuration of the wireless network client.

In this manner, the present invention provides installation software for automatic configuration of a wireless network client without user intervention. In particular, the user can avoid having to obtain the network identifier for the local WLAN, and can avoid having to navigate confusing configuration set-up interfaces for each wireless network client being configured. Accordingly, increased reliability and reduction in installation time is achieved for configuration of each new wireless network client by a user.

This brief summary has been provided so that the nature of the invention may be understood quickly. A more complete understanding of the invention can be obtained by reference to the following detailed description of the preferred embodiment thereof in connection with the attached drawings.

DETAILED DESCRIPTION OF THE PREFERRED EMBODIMENTS

The present invention implements the functionality to provide for the automatic configuration of a wireless network client in a network environment having a wireless access point without the need for user intervention. In particular, the user can avoid having to obtain network-related information for the local wireless access point, and can avoid having to navigate the confusing configuration set-up interfaces every time a new wireless network client is configured to access the local wireless access point.

Figure 1:
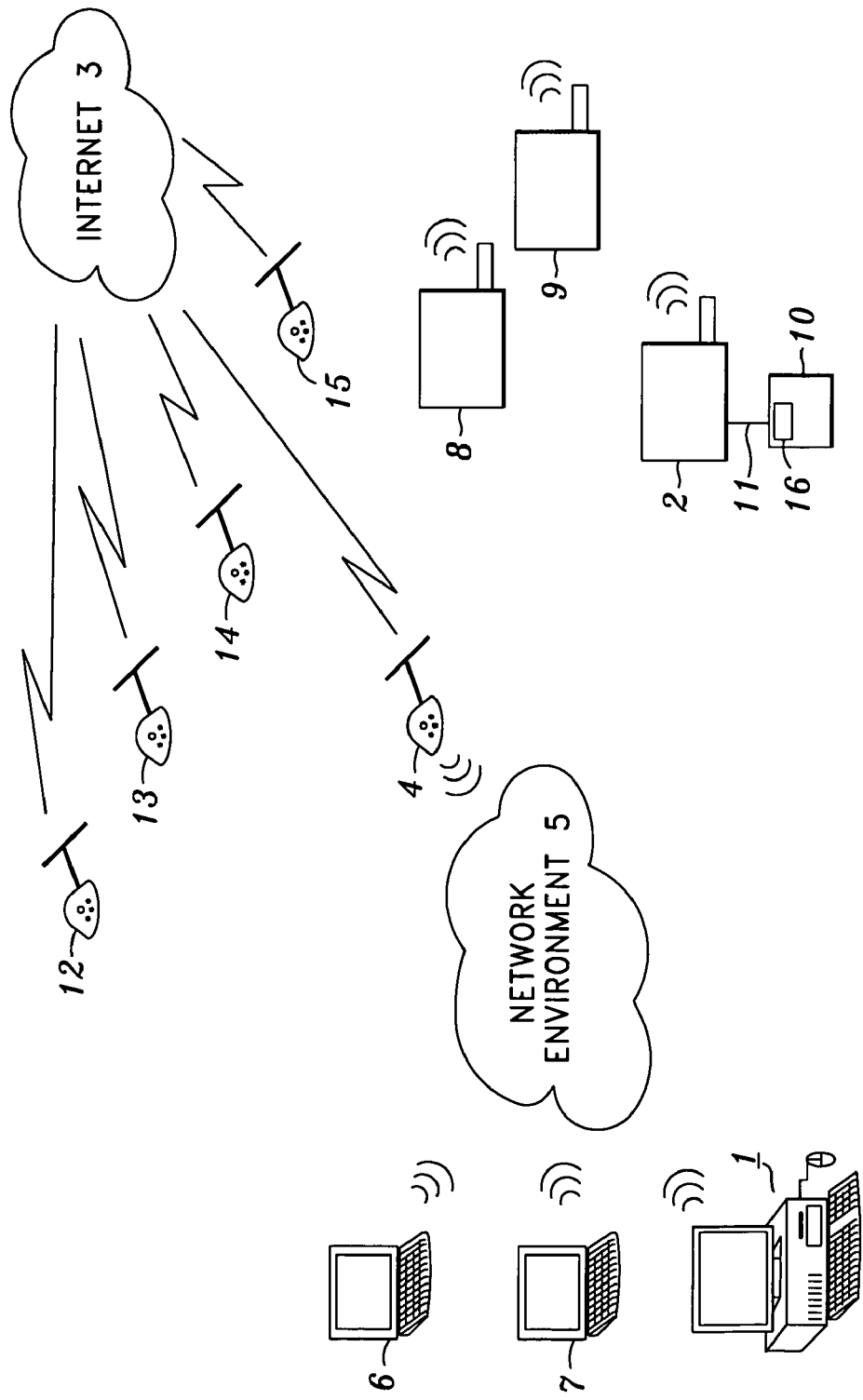
FIG. 1 is a representative view of a network environment in which the present invention maybe implemented according to one embodiment of the invention.

Turning to FIG. 1, a network environment is shown in which the present invention may be implemented. The network environment can either be wireless or a combined wired and wireless network. As seen in FIG. 1, the network environment includes a configured computing device 1, other configured computing devices 6 and 7, a wireless network client 2, a network peripheral 10 connected to the wireless network client 2 through a wired connection 11, a wireless network 5, a wireless access point 4, other wireless access points 12-15, other wireless devices containing a wireless interface card, such as wireless devices 8 and 9, and a connection to the Internet 3 to which all wireless access points are connected.

Configured computing device 1 is preferably a typical personal computer or workstation having a windowing operating system environment. As seen in FIG. 1, configured computing device 1 is already configured to use wireless access point 4 to access the wireless network 5. The components of configured computing device 1 are explained in more detail below with respect to FIG. 2. The other configured computing devices 6 and 7 may be similar to configured computing device 1 and are only depicted to describe a typical network environment.

Wireless access point 4 acts as a wireless communication hub for network devices to communicate with each other or with a wired LAN to which the wireless access point is connected. Configured computing device 1, other configured computing devices 6 and 7, and other wireless devices containing a wireless interface card, and devices 8 and 9, such as wireless shared printers, communicate with the access point 4 to communicate with each other and to connect to the Internet 3. Other wireless access points 12-15 may be similar to access point 4 and are depicted to describe a typical network environment. Wireless access points 12-15 may be used by configured computing device 1, other configured computing devices 6 and 7, and other wireless devices containing a wireless interface card to communicate with each other or to connect with the Internet 3.

The wireless network client 2 is preferably a wireless device containing a wireless interface card or device with the capability to communicate with wireless access point 4 and wireless access points 12-15. The contents of wireless network client 2 are explained in more detail below with respect to FIG. 4. Wireless network client 2 is connected to network peripheral 10 through a wired connection 11, such as a printer or other device containing a display.

As described in more detail below, the present invention as embodied provides for automatic configuration of the wireless network client 2 to use wireless access point 4 via local network 5 with the assistance of configured computing device 1.

Figure 2:
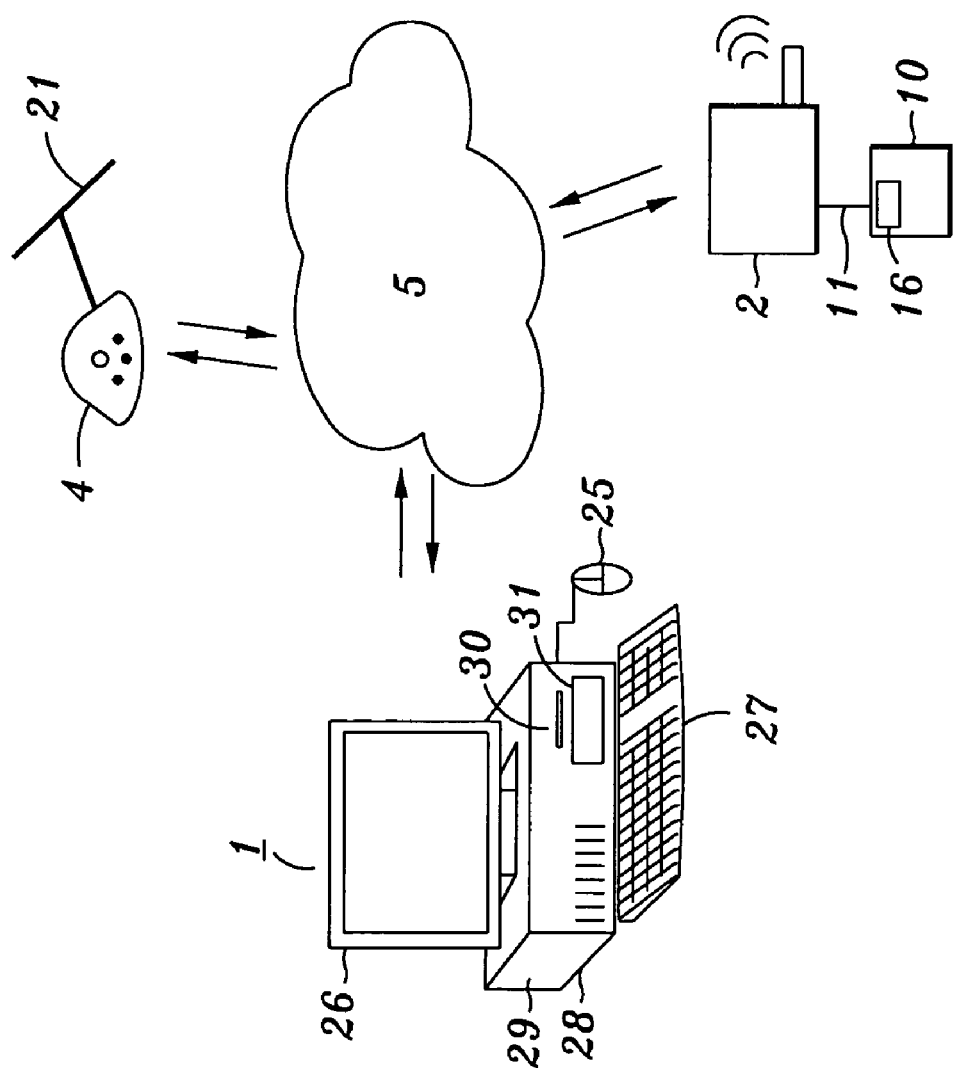
FIG. 2 is a representative view of a local network environment in which the present invention may be implemented according to one embodiment of the invention.

Turning to FIG. 2, local network environment is shown and includes configured computing device 1, wireless access point 4, connection 21 which may be wired, wireless, or a hybrid of the two, wireless network client 2, and network peripheral 10 connected to wireless network client 2 through wired connection 11. Local network 5 provides for network interaction between computing device 1, wireless access point 4, and wireless network client 2.

Configured computing device 1 is preferably a typical personal computer or workstation having a windowing operating system environment, and includes display 26, host processor 28, memory storage 29, mouse 25, keyboard 27, and a floppy disk 30, and CD-ROM drive 31. The contents of memory storage 29 of configured computing device 1 according to the present invention are explained in more detail below with respect to FIG. 3.

Wireless access point 4 acts as a wireless communication hub for network devices to communicate with each other or with a wired LAN to which the wireless access point is connected. As seen in FIG. 2, wireless access point is preferably a typical wireless communication hub. Configured computing device 1 may either interact with wireless access point 4 via wireless communication or a wired connection. Wireless access point 4 contains a wired, wireless, or both a wired and wireless connection 21 to interact with other devices and the Internet 3 via local network 5.

Wireless network client 2 is an unconfigured wireless device containing a wireless interface card or device with the capability to communicate with a wireless access point once it is configured to do so. The contents of the wireless network client 2 are explained in more detail below with respect to FIG. 4. Wireless network client 2 may potentially be connected to network peripheral 10, such as a printer, or other peripheral device, having display 16, through wired connection 11.

As described in more detail below, the present invention provides for the automatic configuration of wireless network client 2, thereby enabling it to access wireless access point 4, without the need for user intervention. In particular, configured computing device 1 initiates client installation software which repeatedly broadcasts a predetermined message, and wireless network client 2 identifies all local wireless networks and then monitors each identified wireless network for the predetermined message. Upon detection of the predetermined message by wireless network client 2, wireless network client 2 configures to access wireless access point 4 on local network in 5 in which the predetermined message was detected. In this manner, an already configured client in the desired wireless local network is used to assist wireless network client 2 to find and configure itself to access wireless access point 4.

Figure 3:
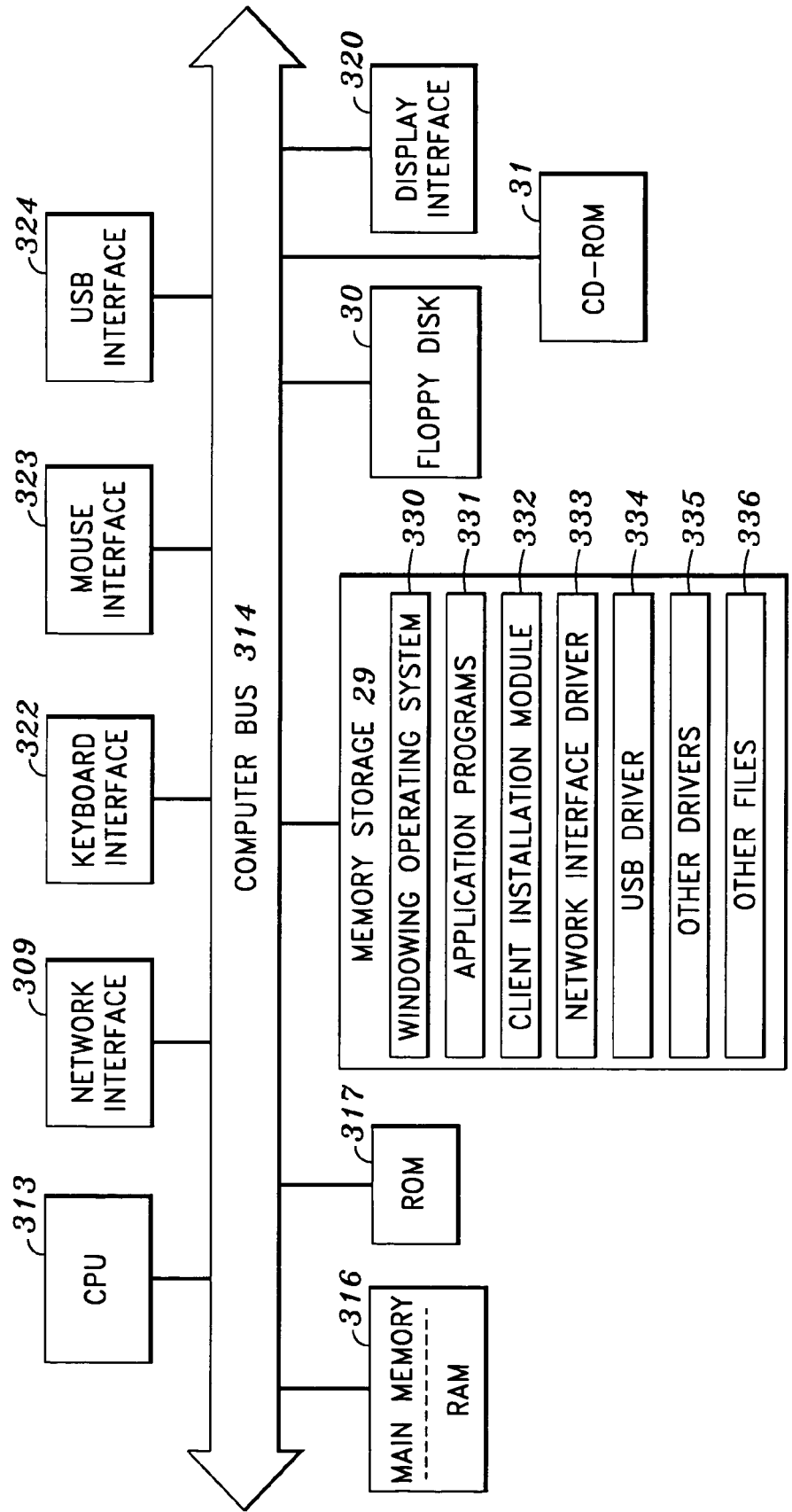
FIG. 3 is a detailed block diagram depicting the internal architecture of a computing device which assists in the configuration of a wireless network client according to one embodiment of the invention.

FIG. 3 is a detailed block diagram showing an overview of the internal architecture of configured computing device 1 depicted in FIG. 2. As shown in FIG. 3, configured computing device 1 is seen to include a central processing unit (CPU) 313 such as a programmable microprocessor which is interfaced to computer bus 314. Also interfaced to the computer bus 314 are memory storage 29, network interface 309 for either wireless or wired interfacing with wireless access point 4 (depicted in FIG. 2), random access memory (RAM) 316 for use as main memory, read only memory (ROM) 317, floppy disk 30, CD-ROM 31, USB interface 324, display interface 320 for interfacing to monitor 26 (depicted in FIG. 2), keyboard interface 322 to keyboard 27 (depicted in FIG. 2), and mouse interface 323 for interfacing to pointing device 25 (depicted in FIG. 2).

Random access memory 316 interfaces to computer bus 314 so as to provide access to memory storage to CPU 313 during execution of software programs such as operating systems, application programs, and device drivers. More specifically, CPU 313 loads computer-executable process steps from memory storage 29 (or other memory media) into a region of random access memory 316, and thereafter executes the stored process steps from random access memory 316 in order to execute software programs. Data also can be stored in random access memory 316, where the data can be accessed by CPU 313 during execution. Read-only-memory (ROM) 317 stores invariant instruction sequences, such as start-up instruction sequences for CPU 313 or basic input/output operating system ("BIOS") sequences for the operation of peripheral devices attached to the configured computing device 1.

Memory storage 29 is one example of a computer-readable medium that stores program instruction sequences executable by CPU 313 so as to constitute operating system 330, network interface driver 333 for driving network interface 309, USB driver 334 for driving USB interface 324, and other drivers, for driving other interfaces, such as a display interface driver for driving display interface 320. Operating system 330 is preferably a windowing operating system, such as Windows CE, XP, Me, 2000 and NT, although other types of operating systems such as other Windows operating systems, DOS, UNIX, LINUX, and Macintosh operating systems may be used with the present invention.

Memory storage 29 also comprises application programs 331, client installation module 332, and other files 336. Application programs 331 consists of various application programs for execution by CPU 313 of configured computing device 1 and may include any type of known application, such as word process applications, finance applications, games, etc. Client installation module 322 is a software module which implements the functionality of the present invention to assist in the automatic configuration of the wireless network client 2. Lastly, other files 336 is comprised of other programs and files which may be necessary to operate configured computing device 1, or which are utilized by a user of configured computing device 1.

Figure 4:
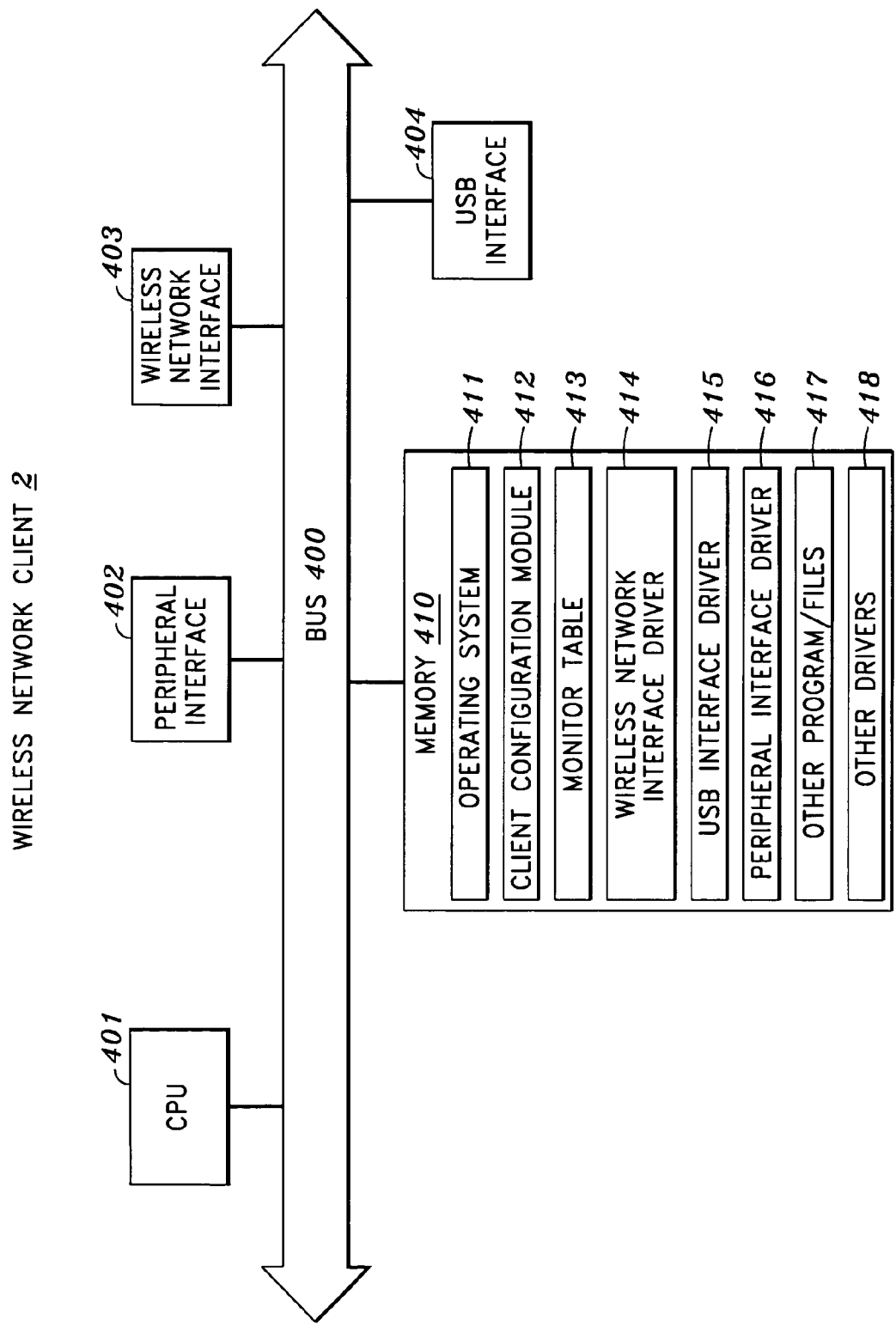
FIG. 4 is a detailed block diagram depicting the internal architecture of a wireless network client according to one embodiment of the invention.

Turning to FIG. 4, the internal architecture of wireless network client 2 is shown. As discussed above, wireless network client 2 is a device, such as a laptop computer, printer, and the like, which contains a wireless interface card or device with the capability to communicate with wireless access point 4. As seen in FIG. 4, wireless network client 2 includes CPU 401 which is interfaced to bus 400, a peripheral interface 402 for interfacing with peripheral device 10 through wired connection 11, a wireless network interface 403 for interfacing to a wireless interface card or device with the capability to communicate wirelessly, a USB interface 404 to support a USB connection to other devices, and memory 410. CPU 401 and bus 400 operate in a similar fashion to their counterparts in configured computing device 1 and are therefore not described in further detail.

Memory 410 can be a random access memory (RAM) or another type of memory medium, and comprises operating system 411, client configuration module 412, monitor table 413, wireless network interface driver 414, USB interface driver 415, peripheral interface driver 416, other drivers 418, and other programs/files 417. Operating system 411 may or may not be a windowing operating system but must at minimum be a basic operating system for maintaining operation of wireless network client 2. Similar to configured computing device 1, it is important to note that, although memory 410 of wireless network client 2 may contain other applications and files, they are not necessary for the implementation of the present invention. Specifically, wireless network client 2 need only utilize the client configuration module 412 to execute the automatic configuration process of the present invention. This functionality for automatic configuration process is described in more detail below. Monitor table 413 is used to store information discovered during the automatic configuration process, and preferably contains entries for each discovered access point, along with corresponding information of the particular access point.

The internal architecture of wireless access point 4 shown in FIG. 2 is not described herein because it is typical of such known devices.

Figure 5:
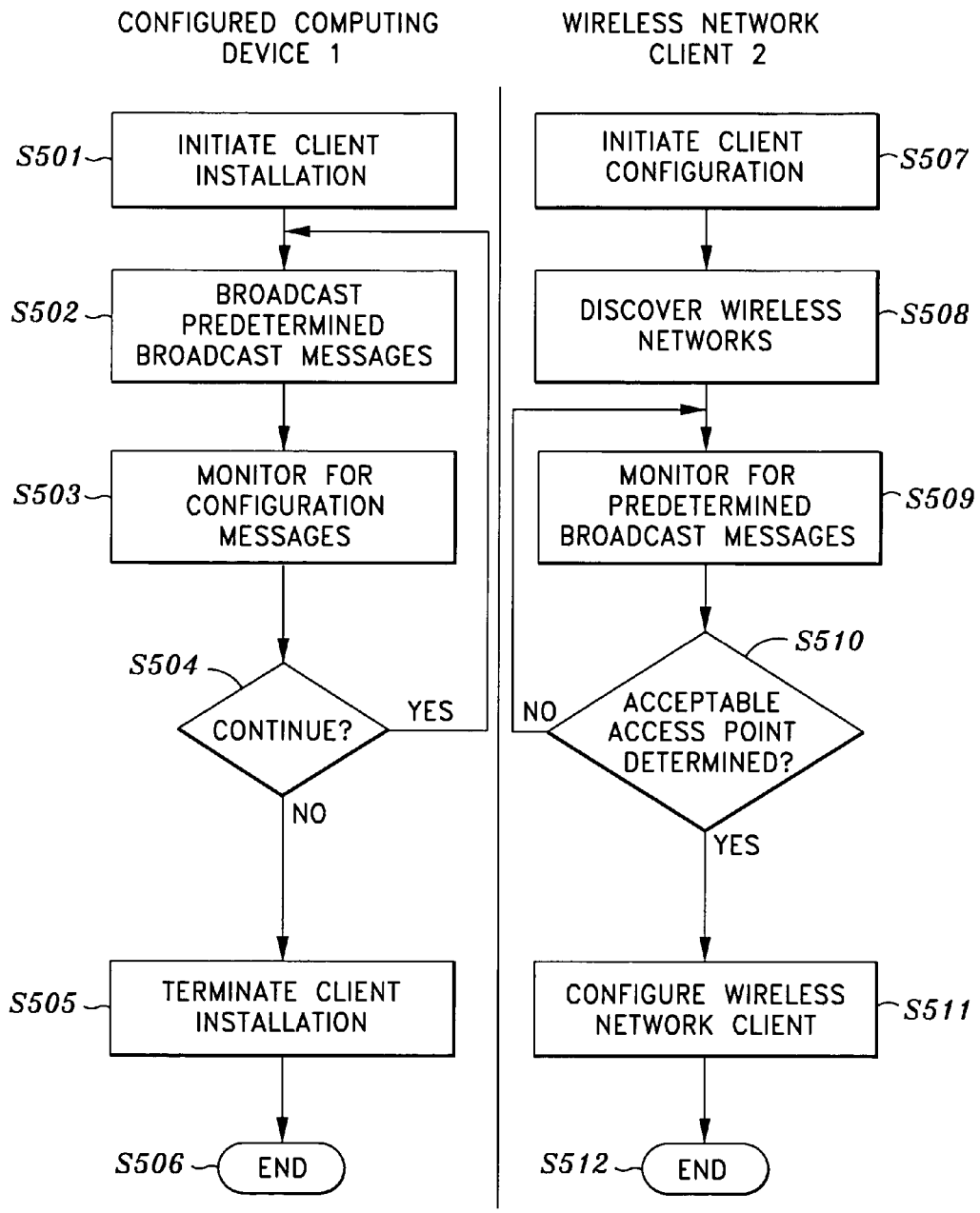
FIG. 5 is a flow chart for explaining parallel processes which are performed to implement the present invention according to one embodiment of the invention.

FIG. 5 is a flow chart depicting the basic steps of the automatic configuration process for implementing the configuration of wireless network client 2 As seen in FIG. 5, configured computing device 1 and wireless network client 2 proceed with separate processes in parallel in order to achieve configuration of wireless network client 2.

The configured computing device 1, which has already been configured to access wireless access point 4 in network environment 5, proceeds through a client installation initiation step S501, a broadcast predetermined broadcast message step S502, a monitor for configuration messages step S503, a continue determination step S504, and a terminate client installation step S505. More specifically, the initiate client installation step S501 initiates the installation process of wireless network client 2. During the installation process, broadcast predetermined broadcast message step S502 broadcasts a predetermined message on local network 5 via wireless access point 4. The monitor for configuration messages step S503 monitors local network 5 which corresponds to the particular wireless access point 4 for detection of a configuration announcement message from a new wireless network client, in this case, wireless network client 2. The continue process step S504 determines whether to continue the broadcast step S502 and the monitor step S503, or to terminate the client installation process by proceeding to step S505. The terminate client installation step S505 terminates the process in the case that a configuration announcement message from wireless network client 2 is detected in step S503, or in the case that a predetermined timeout period has elapsed. Process flow then ends in step S506. This determination step is described in more detail below with respect to FIG. 6.

In a parallel track, wireless network client 2 proceeds through an initiate client configuration step S507, a discover wireless networks step S508, a monitor for predetermined broadcast message step S509, an acceptable access point determined step S510, and a configure wireless network client step S511, according to the invention. More specifically, the initiate client configuration step S507 initiates the execution of client installation module 332 to carry out the automatic configuration of wireless network client 2 according to the present invention. The discover wireless network step S508 discovers and stores in monitor table 413 the wireless network identity of each discovered ones of wireless access points 4 and 12-15 in the entire network environment. The monitor for predetermined broadcast message step S509 monitors each identified wireless local network identity in order to detect a predetermined broadcast message on that wireless local network. The acceptable access point determined step S510 determines if an acceptable access point has been discovered based on detection of a predetermined broadcast message in step S509. If an acceptable access point has been discovered, the process continues to step S511, otherwise the process continues to monitor for predetermined broadcast messages in step S509 unless a predetermined time has expired. The configure wireless network client step S511, in the case that an appropriate predetermined broadcast message is detected in step S509, configures wireless network client 2 to access the wireless access point corresponding to the wireless local network on which the predetermined broadcast message was detected. Subsequently, wireless network client 2 broadcasts a configuration announcement message on the local network 5 to announce that it is now using the same local wireless network as wireless access point 4. The functionality of wireless network client 2 is described in more detail below with respect to FIG. 7.

Figure 6:
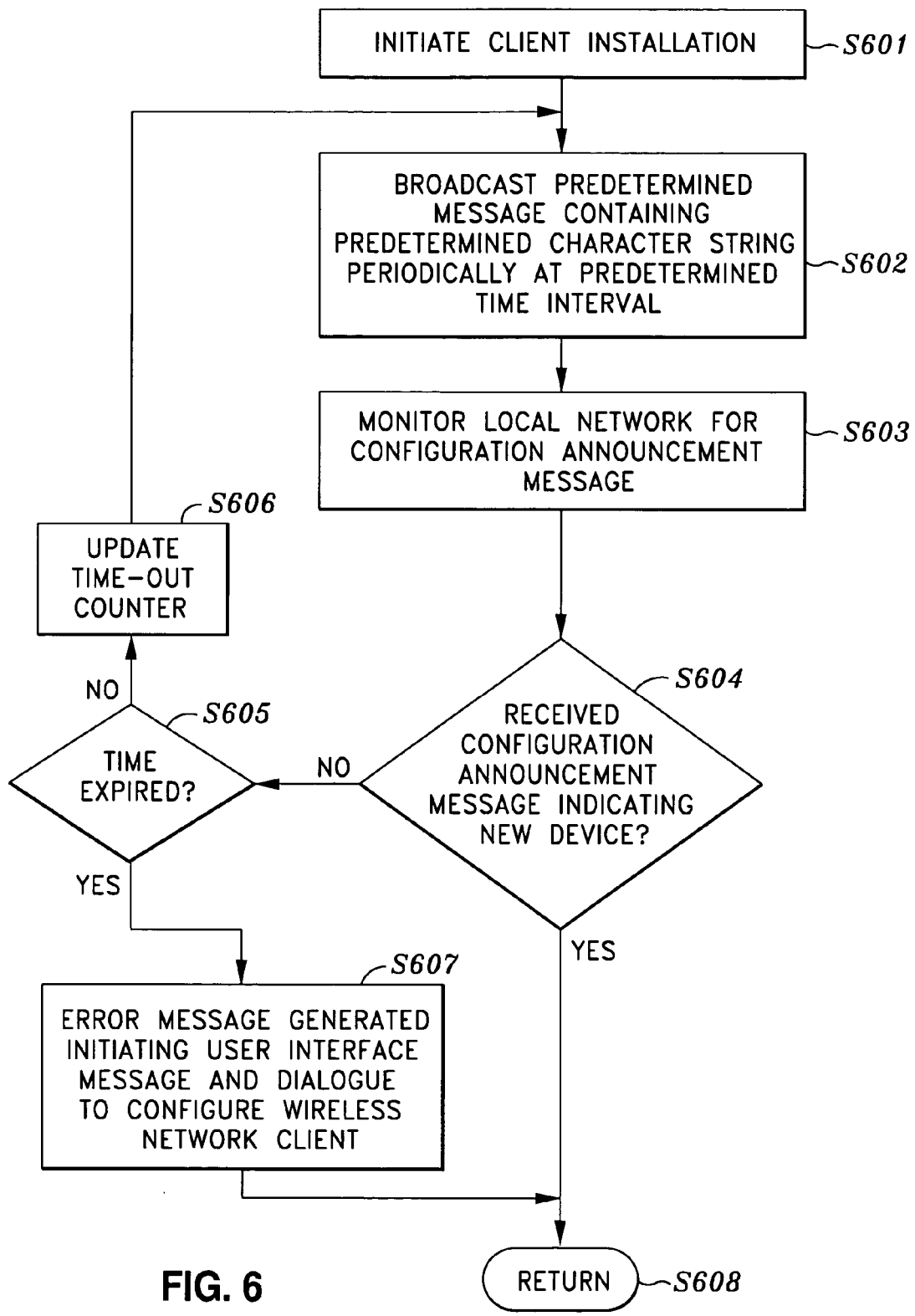
FIG. 6 is a flow chart for explaining in detail the process performed by a configured client computer to implement the present invention according to one embodiment of the invention.

FIG. 6 is a flow chart for explaining in more detail the client installation process performed in configured computing device 1. In initiate client installation step S601, the user initiates client installation module 412 which is already stored onto memory storage 29 of configured computing device 1 from either the Internet 3, or installed from another source such as CD-ROM 31. The installation program then initiates the client installation to run in order to automatically configure the wireless network client 2.

In step S602, the predetermined broadcast message containing the predetermined character string is broadcasted periodically at a predetermined time interval. In a preferred embodiment of the invention, the configured computing device 1 opens a UDP socket in order to eventually create subnet directed broadcasts. If the client port parameter is specified, the configured computing device 1 binds to the specified port. Subsequently, the configured computing device 1 identifies all the wired and wireless connected access points capable of broadcasting on the network 5. For each wireless access point discovered, the respective IP address for the wireless access point is placed in a list stored to random access memory 316 and/or memory storage 29. If the list of IP addresses is unable to be created through detection of wireless and wired connected access points, a list of IP addresses is obtained from the operating system 330 of the configured computing device 1. Once the list of IP addresses for all wireless and wired connected access points capable of broadcasting on the network 5 is created, the list of IP addresses is iterated to determine if the loopback address (127.0.0.1) is contained within the list of IP addresses. If the loopback address is not within the list of IP addresses, the loopback address is added to the list of IP addresses. For each address in the list of IP addresses of wired and wireless connected access points capable of broadcasting on the network 5, the IP address is changed to an applicable broadcast address based on the class of the IP address as follows: (1) for Class A addresses, the IP addresses' last 3 bytes are changed to 255; (2) for Class B addresses, the IP addresses' last 2 bytes are changed to 255; and for Class C addresses, the IP addresses' last byte is changed to 255. In the preferred embodiment of the invention, at this stage in the process a list of broadcast addresses is stored to random access memory 316 and/or memory storage 29 on the configured computing device 1.

The predetermined character string broadcasted in the predetermined broadcast message from configured computing device 1 is preferably a 48-byte long string. Preferably, the first 12 bytes (header) and the last 4 bytes (footer) are known to wireless network client 2. The header and footer enclose 32 bytes of data of which the content varies depending upon the embodiment of the invention. For example, according to one embodiment of the invention, the predetermined character string could contain the 12-byte header, 4-byte footer, and 32 bytes of data. The 32 bytes of data could contain the IP address of the configured computing device 1 which is broadcasting the predetermined broadcast message.

More specifically, in order for the wireless network client 2 to automatically configure, for each broadcast address in the list of broadcast addresses, the configured computing device 1 sends a UDP broadcast packet containing the predetermined broadcast message. If the port parameter for the UDP broadcast packet is specified, the packet is also sent on the port(s) specified. Otherwise, a predetermined port parameter is used for all UDP broadcast packets.

In step S603, configured computing device 1 monitors local network 5 for a configuration announcement message from the wireless network client 2 indicating that it has detected the predetermined broadcast message and notifying of the wireless network client's 2 registration onto the network 5, on which wireless access point 4 resides. The configuration announcement message from the wireless network client 2 is a device discovery announcement in according with a device discovery protocol, and preferably includes a state variable indicating that wireless network client 2 is a new device on local-network 5 and including an address of wireless network client 2.

In step S604, it is determined if configured computing device 1 received a configuration announcement message from the wireless network client 2 which contains an indication that wireless network client 2 is a new device, and if so, the process is completed and proceeds to return in step S608. If not, the process proceeds to step S605 to determine if a predetermined time to monitor for the broadcast announcement message has expired. The mechanism for calculating the predetermined time to monitor is beyond the scope of this invention, but is typically calculated by identifying the load on the network. For example, the predetermined time to monitor may default to a setting of thirty seconds. If the predetermined time to monitor for the broadcast announcement message has not expired in step S605, a time-out counter stored in random access memory 316 of configured computing device 1 is incremented by a predetermined time increment in step S606. Next, the process proceeds back to step S602, which repeats broadcast and monitor steps S602 and S603.

If in step S605, the predetermined time to monitor for the broadcast announcement message has expired, the process flows to step S607, in which an error message is generated. Preferably, the error message initiates a user-interface message on display 26 of configured computing device 1, and the user-interface message indicates that manual identification of a wireless local network identity for configuration of wireless network client 2 is required, and that wireless network client 2 must be connected to computing device 1 to complete configuration of wireless network client 2. The user-interface message includes a list of wireless local network identities in the network environment. In response to a user selection of a displayed wireless local network identity through keyboard 27 or mouse 25, a configuration message is sent from the computing device 1 to the wireless network client 2, via a connection such as a USB connection, which contains the designated wireless network identity for configuring the wireless network client 2.

According to another embodiment of the invention, if wireless network client 2 is attached to the network peripheral 10 containing display 16, a user-interface message is generated and sent to peripheral 10 for display on display 16 of network peripheral 10. The user-interface message on the display of the network peripheral 10 indicates that manual identification of a wireless local network identity for use by the wireless network client 2 is required and includes a list of wireless local network identities in the wireless network environment. In response to a user designation of a displayed wireless local network identity, a configuration message is sent from peripheral 10 to wireless network client 2 which contains the designated wireless network identity for configuring wireless network client 2. According to another embodiment of the invention, the user attaches wireless network client 2 directly to the configured computing device 1 through USB interface 324 or other similar port interface, and wireless network client 2 uploads the monitor table 413 to the configured computing device 1 to allow for the user to select a wireless access point specifically detected by the wireless network client 2. At the conclusion of the error message generation step S607, the process proceeds to the return step S608 described below.

Figure 7:
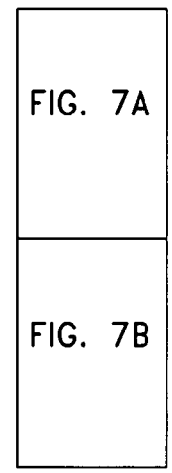
FIG. 7 is a flow chart explaining in detail the process performed by an unconfigured wireless network client to implement the present invention according to one embodiment of the invention.
Figure 7A:
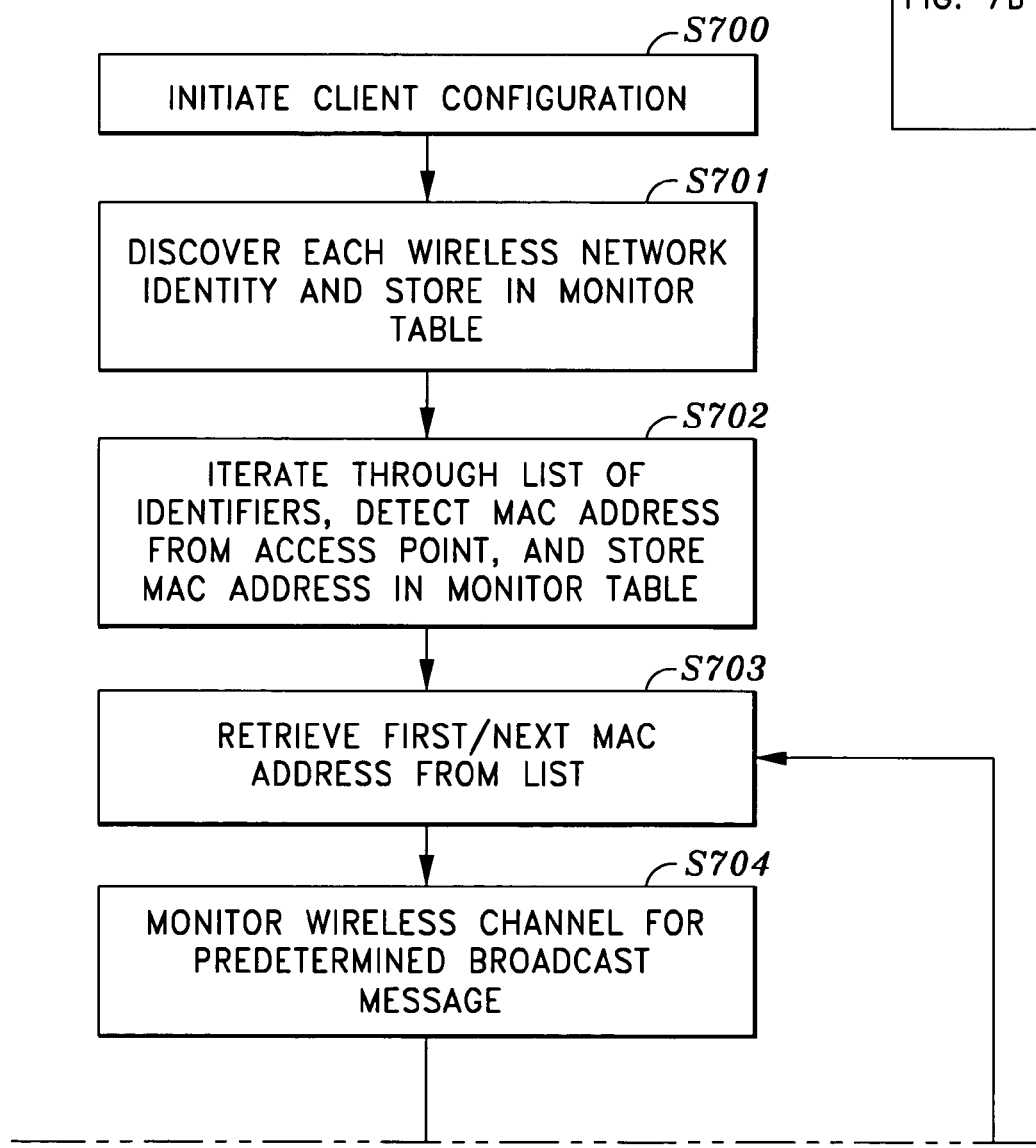
Figure 7B:
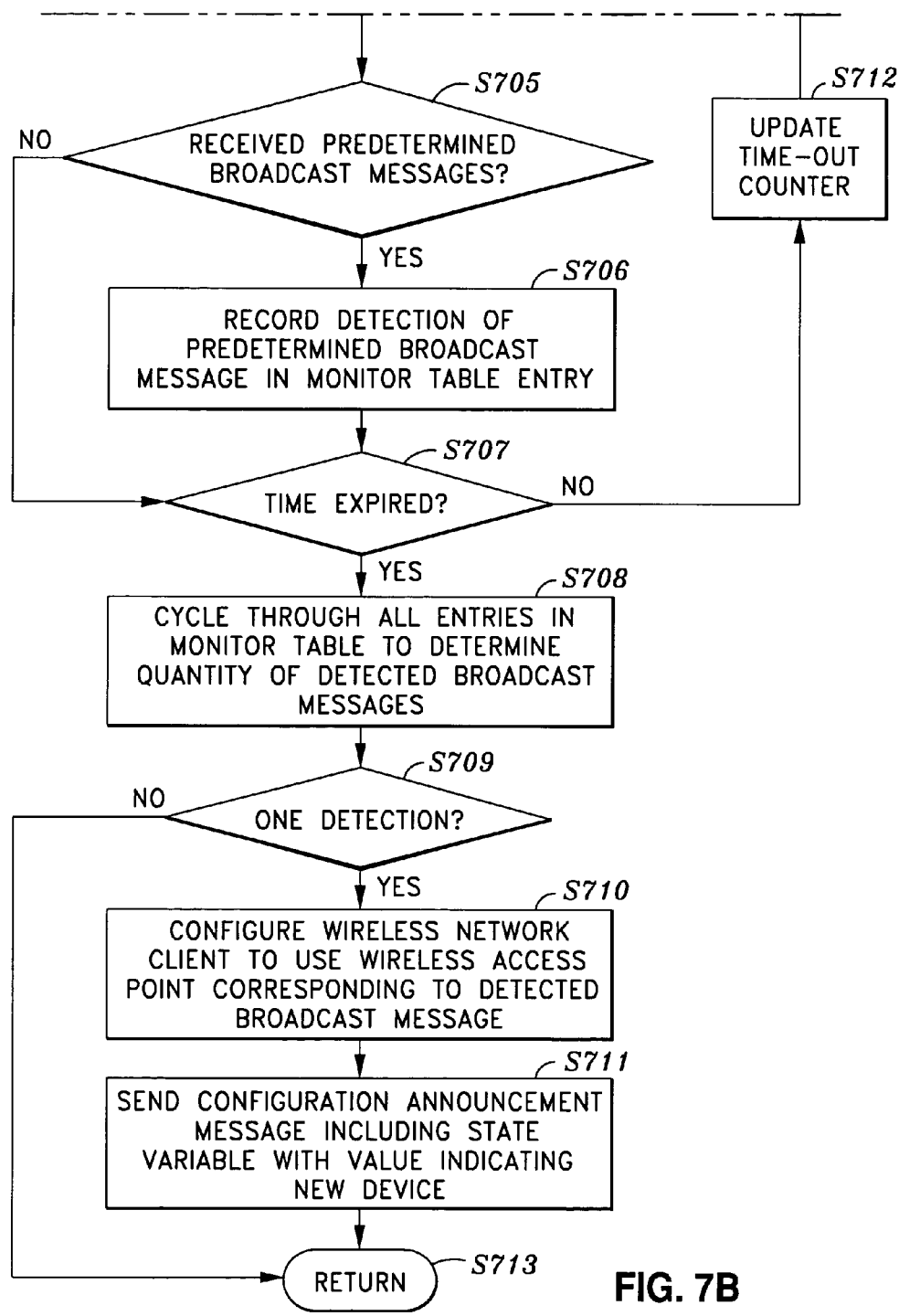

FIG. 7 is a flow chart for explaining in more detail the process performed in wireless network client 2 according to the present invention. Briefly, wireless network client 2 scans the network for discovering wireless access points, creates and stores a list of the detected wireless access points, monitors each detected wireless access point for a predetermined broadcast message, records, if the predetermined broadcast message is detected, appropriate details pertaining to corresponding wireless access point, and broadcasts a configuration announcement message containing information pertaining to the new configuration of wireless network client 2.

In more detail, wireless network client 2 initiates client configuration module 412 in step S700. Wireless network client 2 initializes the configuration process in order for wireless network client 2 to eventually detect the predetermined broadcast message from configured computing device 1 and configure itself automatically. In Step S701, wireless network client 2 discovers the wireless network identity of each wireless access point within receiving range by monitoring each one of a predetermined set of networks for a beacon message from a wireless access point. The beacon message contains the local network identity corresponding to the local network on which the beacon message is detected. For each network identity discovered in step S701, wireless network client 2 stores the corresponding network identifier of the wireless access points in monitor table 413 of memory 410 in wireless network client 2. In step S702, wireless network client 2 iterates through the list of discovered network identifiers contained within monitor table 413, discovers the MAC address from the wireless access point corresponding to each network identifier, and stores the MAC address in the entry of monitor table 413 which corresponds to the network identifier for that wireless access point. Preferably, wireless network client also stores a signal-to-noise ratio in the entry of monitor table 413 which corresponds to the network identifier for the particular wireless access point. The signal-to-noise ratio can be obtained by receiving indicators of signal strength and signal noise from the wireless interface, such as a wireless network card, of wireless network client 2, and then calculating a signal-to-noise ratio based on the obtained values of signal strength and signal noise.

In Step S703, wireless network client 2 iterates through the list of network identifiers by obtaining the next MAC address of the wireless access point corresponding to the discovered wireless local network identity. Then in step S704, wireless network client 2 monitors predetermined channels of the identified wireless local network for a predetermined period of time. If in step S705, wireless network client 2 detects the predetermined broadcast message on the monitored local network, the process proceeds to step S706 in which wireless network client 2 records the detection of the predetermined broadcast message in a monitor table 413 entry corresponding to the local network identity of the local network on which the predetermined broadcast message was detected. The process then proceeds to step S707.

If in step S705 wireless network client 2 does not detect a predetermined broadcast message, the process proceeds directly to step S707, in which it is determined if a predetermined period of time has expired for detecting a predetermined broadcast message in any of the identified networks. If the predetermined period of time to detect a predetermined broadcast message in any of the identified networks has not expired, a time-out counter stored in memory 410 of wireless network client 2 is incremented by a predetermined time increment in step S712, and then the process proceeds back to step S703 in which wireless network client 2 obtains the next MAC address of a wireless access point corresponding to a discovered wireless local network identity for monitoring.

If in step S707 the predetermined period of time has expired, wireless network client 2 stops monitoring for detection of the predetermined broadcast message and proceeds to step S708, in which wireless network client 2 cycles through all the entries in monitor table 413 to determine the total number of predetermined broadcast messages that have been detected. If in step S709, only one predetermined broadcast message was detected, the process proceeds to step S710, in which wireless network client 2 configures itself to use the wireless access point corresponding to the wireless local network on which the message was detected. In this regard, the determination in step S709, can be made by checking to see if only one predetermined broadcast message was actually detected. In an alternative, embodiment, the determination can be satisfied when more than one predetermined broadcast message is actually detected, if only one of the wireless local networks on which predetermined broadcast messages were detected has a signal-to-noise ratio which is above a predetermined threshold. The signal-to-noise ratio for each wireless access point can be obtained from the corresponding entry in monitor table 413, as discussed above with respect to step S702. Next, in step 711, a configuration announcement message is sent by wireless network client 2, which is preferably a device discovery announcement in accordance with a device discovery protocol, and which includes a state variable having a predetermined value indicating that wireless network client 2 is a new device on local network 5. Process then passes to return in step S713.

If in step S709 more than one or no predetermined broadcast messages are detected by wireless network client 2, wireless network client 2 is not configured and end-user intervention will be required for completing configuration, and the process passes to return in step S713. For example, wireless network client 2 may receive more than one predetermined broadcast message, if there are more than one configured clients which are running installation programs at the same time.

According to the foregoing features, the present invention provides for the automatic configuration of wireless network client in a network environment without the need for user intervention. In particular, the user can avoid having to obtain the network identifier and other network-related information for the local wireless access point, and can avoid having to navigate a confusing configuration set-up interface for each time a wireless network client is added or is configured in the local wireless network.

Although the invention has been described with particular illustrative embodiments, the invention is not limited to the above-described embodiments and various changes and modification may be made by those of ordinary skill in the art without departing from the spirit and scope of the invention.

What is claimed is:

1. A method for use in a wireless network client to configure the wireless network client to access a wireless local area network (WLAN), wherein the WLAN includes multiple wireless access points and a computing device which is already configured to access the WLAN using one of the multiple wireless access points, the method comprising:

a discovery step of discovering a wireless local network identity of each of the multiple wireless access points in the WLAN;

a monitoring step of monitoring each identified wireless local network identity for detection of a predetermined broadcast message, wherein the predetermined broadcast message is broadcast via said one wireless access point by the already-configured computing device, and wherein the predetermined broadcast message contains a network address of the already-configured computing device; and a configuration step of configuring, in the case that the predetermined broadcast message is detected in the monitoring step, the wireless network client to access the WLAN via the wireless access point corresponding to the wireless local network identity on which the predetermined broadcast message was detected, and sending a configuration announcement message to the already-configured computing device from the wireless network client on the wireless local network, by using the network address of the already-configured computing device as contained in the predetermined broadcast message, so as to signal the already-configured computing device to terminate broadcast of the predetermined broadcast message.

2. The method according to claim 1, wherein the discovery step discovers the wireless local network identity of each wireless access point by monitoring each one of a predetermined set of wireless local networks for a beacon message from a wireless access point, and the beacon message contains the wireless local network identity corresponding to the wireless local network on which the beacon message is detected.

3. The method according to claim 1, wherein the discovery step discovers the wireless local network identity of each wireless access point by sending a probe request message and monitoring for detection of a probe response message issued by a wireless access point in response to the probe request message, the probe response message containing the wireless local network identity corresponding to the wireless local network on which the probe response message is detected.

4. The method according to claim 1, wherein the monitoring step monitors each identified wireless local network for a predetermined period of time.

5. The method according to claim 1, wherein, in the monitoring step, each one of a plurality of predetermined wireless channels is monitored for each identified wireless local network for a predetermined period of time.

6. The method according to claim 1, wherein, in the discovery step, the wireless network client obtains a MAC address of the wireless access point and a signal-to-noise ratio corresponding to each discovered wireless local network identity.

7. The method according to claim 1, wherein, in the monitoring step, the wireless network client records the detection of each predetermined broadcast message in a table entry of a monitor table.

8. The method according to claim 7, wherein the table entry corresponds to the wireless local network identity of the wireless local network on which the predetermined broadcast message was detected.

9. The method according to claim 1, wherein, in the monitoring step, in the case that the predetermined broadcast message is not detected in any of the identified wireless local networks after a predetermined period of time, the wireless network client stops monitoring for detection of the predetermined broadcast message.

10. The method according to claim 1, wherein, in the configuration step, the wireless network client is configured in the case that only one predetermined broadcast message is detected in the monitoring step.

11. The method according to claim 1, wherein, in the configuration step, the wireless network client records a MAC address of the wireless access point corresponding to the wireless local network of the detected predetermined broadcast message.

12. The method according to claim 1, wherein the predetermined broadcast message includes a predetermined character string.

13. The method according to claim 1, wherein the network address contained in the predetermined broadcast message includes the IP address of the already-configured computing device.

14. The method according to claim 1, wherein, in the configuration step, the configuration announcement message sent by the wireless network client is a device discovery announcement in accordance with a device discovery protocol.

15. The method according to claim 1, wherein, in the configuration step, the configuration announcement message includes a state variable having a value which indicates that the wireless network client is a new device on the wireless local network.

16. The method according to claim 1, wherein the method is initiated in the case that power to the wireless network client is cycled and the wireless network client is unconfigured.

17. A wireless network client device for accessing an appropriate wireless access point in a wireless network environment, comprising:
a program memory for storing process steps executable to perform a method according to any of claims 1 to 16; and
a processor for executing the process steps stored in said program memory.

18. A computer-readable medium which stores computer-executable process steps, the computer-executable process steps for configuring a wireless network client to access an appropriate wireless access point in a wireless network environment, said computer-executable process steps comprising process steps executable to perform a method according to any of claims 1 to 16.

19. A method executed by a computing device which is already configured to access a particular wireless access point in a network environment, the method for configuring an unconfigured wireless network client to access the same particular wireless access point, the method comprising:
a broadcast step of initiating broadcasts from the already-configured computing device of a predetermined broadcast message on a wireless local network which corresponds to the particular wireless access point, wherein said predetermined broadcast message contains a network address of the already-configured computing device;
a monitoring step of monitoring the wireless local network which corresponds to the particular wireless access point for detection of a configuration announcement message sent from the unconfigured wireless network client to the network address contained in the predetermined broadcast message, wherein the configuration announcement message signifies that the unconfigured wireless network client has been configured to access the same particular wireless access point as the already-configured computing device; and
a termination step of terminating, in the case that the configuration announcement message is detected in the monitoring step or in the case that a timeout period has elapsed, the broadcasts from the already-configured computing device of the predetermined broadcast message.

20. The method according to claim 19, wherein the method is performed in response to a user input to the computing device.

21. The method according to claim 19, wherein, in the broadcast step, the predetermined broadcast message contains a predetermined character string.

22. The method according to claim 19, wherein, in the broadcast step, the network address contained in the predetermined broadcast message includes the IP address of the already-configured computing device.

23. The method according to claim 19, wherein, in the broadcast step, the predetermined broadcast message is broadcast periodically at a predetermined time interval.

24. The method according to claim 19, wherein, in the broadcast step, the predetermined broadcast message is a UDP broadcast message.

25. The method according to claim 19, wherein the configuration announcement message from the wireless network client is a device discovery announcement in accordance with a device discovery protocol.

26. The method according to claim 19, wherein the configuration announcement message from the wireless network client includes a state variable which indicates whether the wireless network client is a new device on the wireless local network, and includes a MAC address of the wireless network client.

27. The method according to claim 26, wherein in the terminating step, the broadcasts of the predetermined broadcast message are terminated in the case that the configuration announcement message is detected and if the state variable in the configuration announcement message indicates that the wireless network client is a new device on the wireless local network.

28. The method according to claim 19, further comprising the step of:
a generating step of generating an error message in the case that the timeout period has elapsed and there has been no detection in the monitoring step of a configuration announcement message containing an indication that the wireless network client is a new device on the wireless local network.

29. The method according to claim 28, wherein the error message generated in the generating step initiates a user-interface message on a display connected to the computing device, and the user-interface message indicates that manual identification of a wireless local network identity is required for use by the wireless network client.

30. The method according to claim 29, wherein the displayed user-interface message includes a list of wireless local network identities in the wireless network environment.

31. The method according to claim 30, wherein, in response to a user selection of a displayed wireless local network identity, a configuration message is sent from the computing device to the wireless network client which contains the user selected wireless local network identity for configuring the wireless network client.

32. The method according to claim 28, wherein the error message generated in the generating step initiates a user-interface message on a display of a network peripheral on the wireless local network, and the user-interface message indicates that manual identification of a wireless local network identity is required for use by the wireless network client.

33. The method according to claim 32, wherein the displayed user-interface message includes a list of wireless local network identities in the wireless network environment.

34. The method according to claim 33, wherein, in response to a user selection of a displayed wireless local network identity, a configuration message is sent from the computing device to the wireless network client which contains the user selected wireless local network identity for configuring the wireless network client.

35. A computing device configured to access a particular wireless access point in a wireless network environment and enabled to configure a wireless network client to access the particular wireless access point, the computing device comprising:

a program memory for storing process steps executable to perform a method according to any of claims 19 to 34; and a processor for executing the process steps stored in said program memory.

36. A computer-readable medium which stores computer-executable process steps, the computer-executable process steps for use in a computing device which is configured to access a particular wireless access point in a wireless network environment, for configuring a wireless network client to access the particular wireless access point, said computer-executable process steps comprising process steps executable to perform a method according to any of claims 19 to 34.

* * * * *